United States Patent [19]

Friedberg

[11] 4,063,385
[45] Dec. 20, 1977

[54] METHOD OF PREPARING ZOYSIA SOD FOR PACKAGING AND SHIPMENT

[75] Inventor: Herbert L. Friedberg, Baltimore, Md.

[73] Assignee: The Shelburne Company, Baltimore, Md.

[21] Appl. No.: 732,610

[22] Filed: Oct. 14, 1976

[51] Int. Cl.² .............................................. A01B 79/00
[52] U.S. Cl. ............................................. 47/58; 83/3; 83/5; 83/13; 83/23; 83/39; 56/DIG. 2; 47/56
[58] Field of Search ................... 47/58, 56, 86, 84, 74, 47/9; 172/19, 20; 83/1, 3, 5–13, 23, 39; 37/3; 56/153, 229, DIG. 2

[56] References Cited

U.S. PATENT DOCUMENTS

| | | | |
|---|---|---|---|
| 1,248,540 | 12/1917 | Peterson | 83/11 |
| 2,358,000 | 9/1944 | Cornell | 47/56 X |
| 2,876,588 | 3/1959 | Tietz et al. | 47/56 X |
| 3,064,801 | 11/1962 | Linnell | 47/74 X |
| 3,154,884 | 11/1964 | Amar et al. | 47/9 X |
| 3,519,082 | 7/1970 | Miner | 172/20 X |
| 3,887,013 | 6/1975 | Helberg | 172/20 |

Primary Examiner—E. H. Eickholt
Attorney, Agent, or Firm—D. Paul Weaver

[57] ABSTRACT

Sod is removed from the field in standard width strips and the strips are cut into equal length sections. Excess moisture, when present, is removed from the sod prior to delivering the sod sections to an apparatus which removes excess soil from the bottom of the sod to reduce weight and form a product of uniform thickness. The sod sections are then delivered soil side up to a scoring and trimming apparatus which trims each section to an accurate length and scores the sod partly through the root structure longitudinally and transversely to form a plurality of equally-sized rectangular plugs in each sod section which can be easily separated by a user. Prior to the second scoring operation, pairs of sod sections are placed on moisture-absorbing trays and following the second scoring, plural layers of processed sod sections and intervening trays are placed in superposed relation in a shipping carton having a moisture-impermeable liner. Moisture held in the absorbent trays is gradually given back to the living sod during shipment.

4 Claims, 2 Drawing Figures

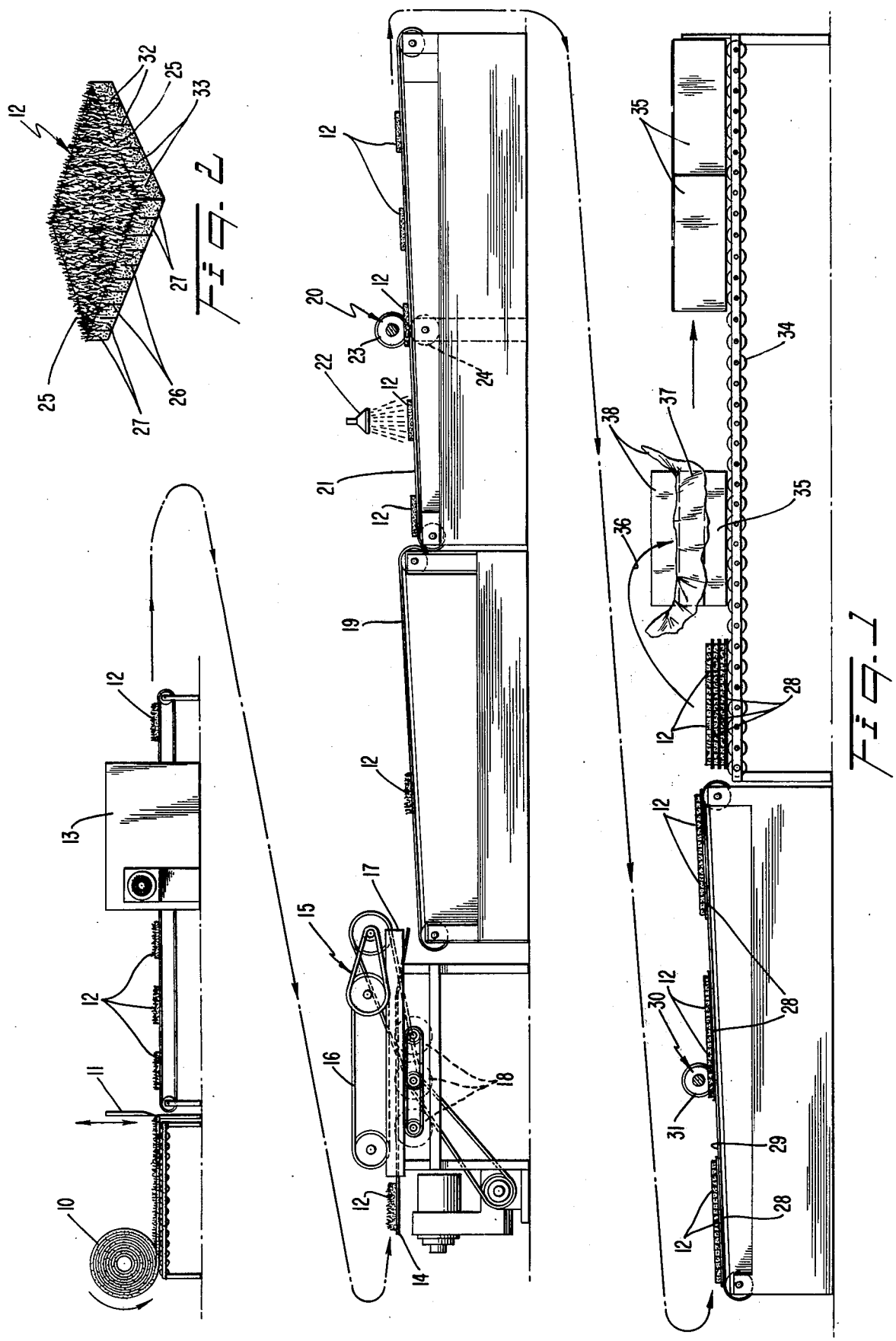

METHOD OF PREPARING ZOYSIA SOD FOR PACKAGING AND SHIPMENT

BACKGROUND OF THE DISCLOSURE

The desirability of Zoysia grass in the making of beautiful lawns is widely recognized with a resulting great demand for Zoysia sod in all regions including some where the Zoysia grass is not natively grown but can be grown successfully. In satisfying the demands for Zoysia grass plugs to be planted by home owners and others, a number of problems exist in connection with shipping the sod or sod plugs in a reasonably fresh living state to the consumer and in shipping the product at a reasonable cost to the consumer. If the sod is packaged and shipped in the same state or condition which prevails when it is harvested, it may contain so much moisture and excess soil as to render it too heavy and bulky for mailing or shipment by commercial package carriers. Also, the sod in its natural state is extremely tough and wiry and very hard to separate by the consumer in small plugs for planting in a lawn in the customary fashion. Available containers are generally unsuitable for shipping the Zoysia sod in terms of their ability to contain moisture without leaking during shipment and to maintain the sod in a living state during shipment to distant regions which in practice may involve up to a week or more of travel time. Containers which might be suitable for this purpose are too expensive to be feasible.

The present invention has arisen as a result of a major effort to overcome all of the above problems involved in preparing Zoysia sod for packaging and shipment in an economical manner and in such a way that the product can be employed by the ultimte user in the most convenient and efficient manner.

SUMMARY OF THE INVENTION

In accordance with the invention, a method of preparing Zoysia sod for shipment to customers involves cutting the sod in strips from a growing field and cutting each strip into approximately equal length sections. Excessive moisture is removed from the sod when necessry and excess soil is scraped or scratched from the sod sections to reduce thickness and weight. Each section is scored in two right angular directions on the soil side, partly through the roots, and each section is trimmed to an accurate length during the first scoring operation. Two sections of sod are placed end-to-end on an absorbent tray formed of cardboard or the like prior to the second scoring, and following the second scoring, several trays with the sod sections thereon are stacked and placed in a shipping container having a bag or liner which is moisture-impermeable. The bag and container flaps may then be closed to complete the Zoysia sod package in a form practical for shipping to a distant customer.

BRIEF DESCRIPTION OF THE DRAWINGS

FIG. 1 is a partly diagrammatic side elevation of apparatus employed in the practice of the method forming the subject matter of this invention.

FIG. 2 is a perspective view of the product resulting from the practice of the method.

DETAILED DESCRIPTION

Referring to the drawings in detail wherein like numerals designate like parts, the Zoysia sod designated by the numeral 10 is cut from the growing field by conventional techniques in standard width elongated strips, such as 10 inch wide strips. Each such Zoysia sod strip is severed by a suitable means 11 to a multiplicity of approximately equal length rectangular sections 12, such as 15 inch sod sections by 10 inches wide. Where the moisture content of the sod is excessive from the standpoint of weight and efficient processing by apparatus embodied in the invention, the necessary moisture is removed from the sod sections 12 by passing them through a moisture removing unit 13, such as a drying chamber, air conditioning chamber or combination device.

When the moisture content of the sod is sufficiently reduced by the unit 13, the sod sections 12 are delivered serially to the horizontal apron 14 of an apparatus 15 for removing excess soil from the bottom, or soil side, of the sod. The sod sections 12 are placed on the apron 14, grass side up, so that an overhead sod conveying means 16 can advance the sod sections 12 through the apparatus 15 toward the discharge end 17 thereof while a coacting countermoving soil scratching or clawing means 18 removes excess soil from the bottom of the sod sections. This operation materially lessens the weight of the sod and renders it substantially uniform in thickness, such as 1½ inches thick compared to 2¼ inches in the initially harvested state. The appearance of the product is also enhanced by removal of excess soil, while adequate soil remains attached to maintain the sod in a healthy state.

It may be mentioned that, in some instances, where the moisture content of the harvested sod is already in the desirable range, the excess moisture removal step may be omitted from the method.

Upon emerging from the excess soil removing apparatus 15, each sod section 12, grass side up, is conveyed by a means 19 toward a first scoring and trimming apparatus 20. Upon reaching the conveyor bed 21 of apparatus 20, each sod section 12 is inverted manually or by suitable mechanical means and the sod sections 12 enter onto the conveyor bed 21, soil side up and grass side down, with the narrow dimension of the rectangular sod section 12 lengthwide on the conveyor bed and the longer dimension (the 15 inch dimension) transversely of the conveyor bed. If necessary, some moisture may be added to the sod sections 12 on the conveyor bed 21 ahead of the first scoring and trimming apparatus 20 by a suitable water delivery means 22.

When each sod section 12 reaches the first scoring and trimming apparatus 20, it is scored on its upwardly facing soil side longitudinally of its line of movement by a series of rotating scoring blades 23 and, simultaneously, the two ends of the sod section are trimmed to a more accurate 15 inch length by coacting trimming blades 24 and upper blades coaxially mounted with the blades 23 at opposite sides of the conveyor bed. After emerging from the apparatus 20, the sod sections 12 have trimmed end faces 25, FIG. 2, defining the ends of the 15 inch dimension and preferably have nine cuts or scores 26 formed therein in equidistantly spaced parallel relation to form preferably ten discrete strips 27 in the sod section. As stated, the scores 26 are formed in the soil side of each sod section and extend only partly through the grass root structure, whereby the several strips 27 remain connected in the sod section. The cuts or scores 26 extend entirely across the 10 inch width of the rectangular sod section 12. It should be understood that the dimensions of the rectangular sod sections are not critical, and can be varied under the invention, and the number and spacing of the scores 26 can likewise be varied. In connection with the above, it is one of the objectives of the invention to supply the customer with a cut sod section of a size convenient to handle and which can be easily separated into a rather large number of plugs. In accomplishing this, it has been found that a 10 inch by 15 inch rectangular sod section, scored to provide 50 plugs is convenient and practical. Additionally, the preferred dimensions for the sod sections 12 are also practical for mailing and shipping by commercial package carriers. Nevertheless, in some cases, the dimensions of the sod section 12 and of the individual plugs may be varied under the invention, and the described preferred dimensions and numbers of plugs per sod section are not to be taken in a limiting sense.

After passing through the first scoring and trimming apparatus 20, an attendant places a pair of the sod sections 12 on a rectangular cardboard tray 28, or equivalent moisture absorbing panel, and in so doing the two sod sections are turned ninety degrees from their positions on the conveyor bed 21 so that their longer (15 inch) dimensions are now lengthwise of the tray 28 and lengthwise of the conveyor bed 29 of a second scoring apparatus 30. The second scoring apparatus 30 is similar to the first apparatus 20, except that it has fewer cutting or scoring blades 31 and no end trimming blades above or below the conveyor bed 28, because the 10 inch width of the sod sections 12 is quite uniform and does not require trimming. The second scoring apparatus 30 preferably has four equidistantly spaced coaxial blades 31 which produce four parallel equidistantly spaced cuts or scores 32, FIG. 2, lengthwise in each sod section 12, at right angles to the transverse scores 26. Five equal width longitudinal parallel strips 33 are thereby formed by the longitudinal scores 32 and like the scores 26, the scores 32 do not penetrate entirely through the roots. The intersecting scores 26 and 32, in effect, form 50 approximately square plugs in the sod section 12 which measure approximately 1¼ inch on each side. The plugs remain joined in the sod section 12 since the scores 26 and 32 are not formed entirely through the root system. The arrangement is such that the user of the sod can readily separate the plugs by hand from the section 12 and they are of a proper size for implantation in a lawn. At the second scoring apparatus 30, pairs of the sod sections 12 in end-to-end relationship on the cardboard trays 28 are scored longitudinally, as described, while their grass sides are downward on the trays.

After leaving the second scoring apparatus 30, the individual trays 28 with the two treated sod sections 12 thereon are lifted from the conveyor bed 29 and stacked on a roller conveyor bed 34 forming a packaging station. Three or more of the trays 28 with their sod sections are included in the stacked array which is then lifted and placed in a shipping container 35, as indicated by the arrow 36. The container 35 may be a corrugated board box having a flexible moisture impermeable bag liner 37 which receives the several layers of sod sections and the absorbent trays 28 arranged between them. Depending upon the dimensions of the container 35, a greater or lesser number of trays 28 and sod sections may be packaged. In any case, the number of layers is such that the box 35 is substantially completely filled so that no empty space remains after closing the mouth of the bag 37 and sealing the box closure flaps 38. Since the contents of the box substantially completely fills it, the sod cannot move appreciably during handling or shipping, which otherwise could cause disintegration of the sod.

The several cardboard trays or panels 28 absorb moisture naturally present in the sod sections 12 or added thereto by the means 22. During shipment, in the closed containers 35, moisture cannot escape from the package because of the impermeable liner 37. During shipment, the moisture held in the trays 38 is gradually returned into the sod by capillary action as the sod tends to dry, and this assures that the sod will remain in a healthy state during shipment to quite distant destinations.

The user, upon opening the box 35, can remove and use the sod one layer at a time to again prolong the useful life of the underlying layers in the package. When the sod sections 12 are removed from the package, the individual plugs formed by the intersecting cuts or scores 26 and 32 are easily separated by hand for planting.

It may be seen that the invention satisfies a two-fold need in connection with the distribution of Zoysia grass plugs or sod to distant consumers. By means of the invention, the cut sod is processed in the described manner to rid it of excess moisture soil and bulk so that it can be packaged and shipped in a healthy state at relatively low cost and in a secure package.

Secondly, the invention results in placing a product in the hands of the consumer which is convenient to use and in a form which expedites and promotes the proper installation of small Zoysia plugs in a lawn. It is believed that the advantages of the invention are apparent in view of the foregoing description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of treating sod prior to usage thereof by a consumer comprising forming approximately rectangular sections of harvested sod, removing excess moisture from the harvested sod, removing excess soil from the sod sections following the removal of excess moisture to reduce the weight and bulk of the sod sections, and scoring the sod sections on the soil sides thereof in two directions to form on each sod section a multiplicity of attached readily separable sod plugs.

2. A method of preparing sod for planting by a consumer in plug form in a remote location comprising harvesting sod strips from a growing field, severing the harvested strips into sections of substantially uniform size, removing excess moisture from the sod when present therein prior to the removal of soil, removing excess soil from the sod sections to lessen their weight and bulk while imparting substantially uniform thickness to them, scoring the sod sections partly through their thicknesses in two coordinate directions to form on each section a multiplicity of relatively small readily separable attached sod plugs, and packaging a plurality of the scored sod sections for shipment to distant consumers.

3. The method of claim 2, and the additional step of trimming the sod sections during said scoring at least on one pair of side edges.

4. The method of claim 2, and the additional step of placing the sod sections on moisture-absorbing tray elements prior to said packaging.

* * * * *